Sept. 18, 1945.   D. C. BENTON   2,385,126
BLIND FASTENING BOLT AND NUT
Filed May 30, 1944
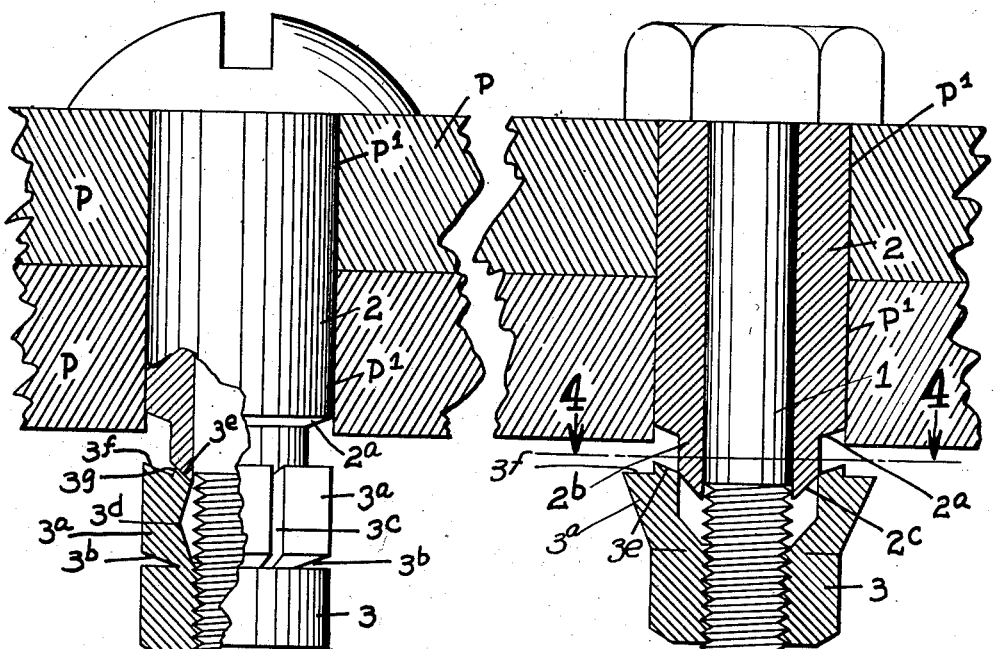
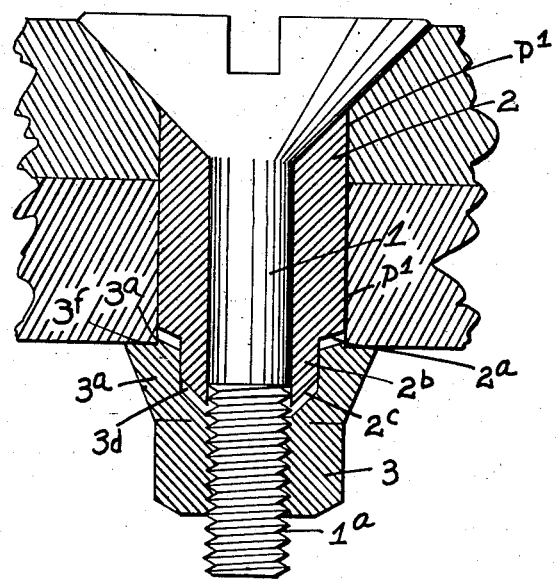
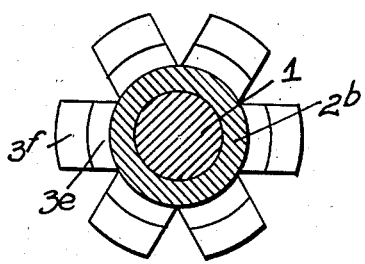
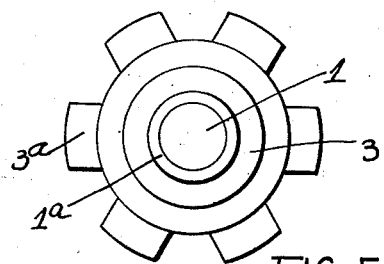
INVENTOR.
DUDLEY C. BENTON
BY A. B. Bowman
ATTORNEY Patented Sept. 18, 1945

2,385,126

UNITED STATES PATENT OFFICE 2,385,126

BLIND FASTENING BOLT AND NUT

Dudley C. Benton, San Diego, Calif., assignor, and by decree of court of one-half to Marie E. Warren, San Diego, Calif.

Application May 30, 1944, Serial No. 538,045

7 Claims. (Cl. 85—2.4)

My invention relates to a combined bolt and nut which is arranged to be secured in position from one side of objects to be connected together, and the objects of my invention are:

First, to provide a combined bolt or nut which may be readily positioned and secured in plates or other objects to be secured together and operable from one side only in which the head of the bolt rests against one side and a portion of the nut rests against the opposite side when tightened;

Second, to provide a bolt and nut of this class in which a portion of the nut is distorted by the tightening of the bolt in the nut so that a portion rests and is secured tightly against one side of the object to be secured together;

Third, to provide a bolt and nut of this class which provides a substantial surface engagement of the nut with the object to be secured on the opposite side from the head of the bolt;

Fourth, to provide a bolt and nut of this class in which a portion of the nut is distorted by the action of a sleeve surrounding the bolt when tightening the bolt in the nut, but in which the sleeve is substantially free from the nut when the bolt and nut are in operative tight position on the object to be secured;

Fifth, to provide a bolt and nut of this class in which the nut is rigidly secured and locked against further distortion during the clamping operation of said bolt and nut after a portion of the nut is securely clamped against one side of one of the objects to be secured;

Sixth, to provide a bolt and nut of this class which will stand a maximum of pressure in the operation of clamping two or more objects together;

Seventh, to provide a novelly constructed blind fastening bolt and nut; and

Eighth, to provide a bolt and nut of this class which is very simple and economical of construction, easy to install from one side of the objects to be secured, efficient, durable and providing exceptionable strong securing means.

With these and other objects in view as will appear hereinafter, my invention consists of certain novel features of construction, combination and arrangement of parts and portions as will be hereinafter described in detail and particularly set forth in the appended claims, reference being had to the accompanying drawing and to the characters of reference thereon which form a part of this application in which:

Figure 1 is a side elevational view of my bolt and nut before the nut is started to be tightened into position against the object to be secured showing a slotted headed bolt and showing a portion broken away and in section to facilitate the illustration; Fig. 2 is a sectional view of the same showing the nut in the position after the bolt is started to be tightened in the nut and showing a hexagon shaped headed bolt; Fig. 3 is another sectional view showing the nut in secured relation with the object to be secured and showing a countersunk headed bolt; Fig. 4 is a transverse sectional view taken from the line 4—4 of Fig. 2; and Fig. 5 is an end view taken from the line 5—5 of Fig. 3.

Similar characters of reference refer to similar parts and portions throughout the several views of the drawing:

The bolt 1, sleeve 2, and nut 3 constitute the principal parts of my blind fastening bolt and nut.

The bolt 1 may be any conventional bolt threaded at one end and with any type of conventional head at its opposite end, as shown in Figs. 1, 2 and 3 of the drawing. The holes $P^1$ in the plate P are made enough larger than the bolt body to receive the sleeve 2. The outer edge of these sleeves 2 are flat and straight, as shown in Figs. 1 and 2 of the drawing for the type of bolt head shown in Figs. 1 and 2, while the sleeve 2 in connection with the countersunk head is tapered at its outer end conforming to the head of the bolt, as shown best in Fig. 3 of the drawing. The inner end of the sleeve 2 used in connection with all of the type of bolt heads are the same. This sleeve 2 is provided with an inwardly and downwardly tapered edge or shoulder portion 2a. The sleeve member 2 is provided with a reduced diameter portion 2b at its inner end inwardly from the bevelled portion 2a so that its outer diameter is substantially reduced to form the shoulder 2a. The inner end of this reduced portion 2b is provided with a bevelled portion 2c. This sleeve 2 is arranged to fit the body of the bolt but permits free movement of the bolt therein.

On the threaded end 1a of the bolt is screw-threaded the nut 3 which is provided with an internally screw-threaded portion arranged to fit the threads on the threaded portion 1a of the bolt 1. Extending from the inner side of the nut portion 3 is a skirt 3a which is formed into a plurality of sections. In this case I have shown six. These sections are spaced at their outer sides from the nut portion 3 by a triangular groove 3b, shown best in Fig. 1 of the drawing, and spaced from each other by slots 3c. The inner sides of these skirt portions 3a are each provided with an angular undercut portion 3d. The inner edges of each of these skirt portions 3a are provided with bevelled portions 3e and 3f, the portion 3e being offset from the portion 3f forming a shoulder 3g. The bevelled portion 3e is adapted to ride on the bevelled portion 2c of the sleeve 2 when tightening the bolt in the nut, until its inner side passes off of the bevelled portion 2a, as shown in Fig. 2 of the drawing. Then the portion 3e is arranged to pass between the outer wall of the reduced portion 2b and the plate P, while the portion 3f is arranged to rest against the side of the plate, as shown in Fig. 3 of the drawing with the shoulder 3g resting against the corner at the edge of the plate. Thus this shoulder forms a locking means with the plate to prevent the spreading of the skirt portions 3a under pressure with the turning of the bolt with the nut. It will also be noted that the V-shaped slot 3b is closed, as shown in Figs. 2 and 3, as soon as the bevelled portion 3e has passed off of the bevelled portion 2c, thus strengthening the nut at the weakest portion which is weakened for the purpose of distorting the sleeve portion of the nut.

The operation of my blind fastening bolt and nut is substantially as follows: The sleeve and nut are placed upon the bolt in a position substantially as shown in Fig. 1 of the drawing. Then the bolt with the nut 3 is placed in position in the opening P¹ in the plate P and inserted. The sleeve 2 is enlarged slightly at its outer end so that it provides a substantially tight fit at its outer end in the outer plate P. Then the head of the bolt I is turned, which causes the bevelled portions 3e of the nut skirt 3a to ride on the bevelled portions 2c of the sleeve 2, thus spreading the skirt portions 3a, gradually closing the annular slot 3b and at the same time the inner side of the bevelled portion 3e passes over the small diameter portion 2b of the sleeve 2, as shown in Fig. 2. Then passes over this reduced portion 2b, as shown in Fig. 3 until the portion 3f engages the side of the plate while the shoulder portion 3g engages the inner side of the hole, thus preventing the skirt portions 3a from spreading and permitting great pressure on the plate P¹ for forcing them and holding them together.

Though I have shown and described a particular construction, combination and arrangement of parts and portions, I do not wish to be limited to this particular construction, combination and arrangement, but desire to include in the scope of my invention, the construction, combination and arrangement substantially as set forth in the appended claims.

Having thus described my invention, what I claim as new and desire to secure by Letters Patent is:

1. In a blind fastening bolt and nut of the class described, the combination of a bolt provided with a head at one end and threaded at its opposite end, a sleeve mounted on the body of said bolt with one end arranged to engage the bolt head and its opposite end provided with a reduced diameter portion with a bevelled end and a nut provided with a slotted apron to provide a plurality of skirt portions with bevelled ends adapted to engage the bevelled end of said reduced diameter portion, each of said skirt portions provided with an offset portion forming a shoulder intermediate the outer and inner side of the end of said skirt portion.

2. In a blind fastening bolt and nut of the class described, the combination of a bolt provided with a head at one end and threaded at its opposite end, a sleeve mounted on the body of said bolt with one end arranged to engage the bolt head and its opposite end provided with a reduced diameter portion with a bevelled end, and a nut provided with a slotted apron to provide a plurality of skirt portions with bevelled ends adapted to engage the bevelled end of said reduced diameter portion, each of said skirt portions provided with an offset portion forming a shoulder intermediate the outer and inner side of the end of said skirt portion, said nut provided with an annular V-shaped closing groove intermediate its ends in its outer surface in opposed relation with the outer end of the threads on said nut forming a weakened portion between said nut and said skirt portion.

3. In a blind fastening bolt and nut of the class described, the combination of a bolt provided with a head at one end and threaded at its opposite end, a sleeve mounted on the body of said bolt with one end arranged to engage the bolt head and its opposite end provided with a reduced diameter portion with a bevelled end and a nut provided with a slotted apron to provide a plurality of skirt portions with bevelled ends adapted to engage the bevelled end of said reduced diameter portion, each of said skirt portions provided with an offset portion forming a shoulder intermediate the outer and inner side of the end of said skirt portion, said skirt portions of said nut provided with angular V-shaped undercut portions at their inner sides.

4. In a device of the class described, the combination with a bolt, of a sleeve mounted on said bolt with one end arranged to engage the bolt head and its other end provided with a reduced diameter portion with a bevelled end, and a nut arranged to thread on said bolt and provided with a slotted apron forming a plurality of skirt portions with bevelled ends adapted to engage the bevelled end of said reduced diameter portion of said sleeve.

5. In a device of the class described, the combination with a bolt, of a sleeve mounted on said bolt with one end arranged to engage the bolt head and its other end provided with a reduced diameter portion with a bevelled end, a nut arranged to thread on said bolt and provided with a slotted apron forming a plurality of skirt portions with bevelled ends adapted to engage the bevelled end of said reduced diameter portion of said sleeve, each of said skirt portions provided with an offset portion forming a shoulder intermediate the outer and inner side of the end of said skirt portion.

6. In a device of the class described, the combination with a bolt, of a sleeve mounted on said bolt with one end arranged to engage the bolt head and its other end provided with a reduced diameter portion with a bevelled end, a nut arranged to thread on said bolt and provided with a slotted apron forming a plurality of skirt portions with bevelled ends adapted to engage the bevelled end of said reduced diameter portion of said sleeve, each of said skirt portions provided with an offset portion forming a shoulder intermediate the outer and inner side of the end of said skirt portion, said nut provided with an annular closing groove intermediate its ends in its outer surface in opposed relation with the outer end of the threads in said nut and forming a weakened portion between the nut and the skirt portion.

7. In a device of the class described, the combination with a bolt, of a sleeve mounted on said bolt with one end arranged to engage the bolt head and its other end provided with a reduced diameter portion with a bevelled end, a nut arranged to thread on said bolt and provided with a slotted apron forming a plurality of skirt portions with bevelled ends adapted to engage the bevelled end of said reduced diameter portion of said sleeve, each of said skirt portions provided with an offset portion forming a shoulder intermediate the outer and inner side of the end of said skirt portion, said nut provided with an annular closing groove intermediate its ends in its outer surface in opposed relation with the outer end of the threads in said nut and forming a weakened portion between the nut and the skirt portion, said skirt portions of said nut provided with angular V-shaped undercut portions at their inner sides.

DUDLEY C. BENTON.